Jan. 29, 1935. H. LEDEEN 1,989,619
BEARING
Filed June 22, 1931 2 Sheets-Sheet 1

Inventor
Hyman Ledeen
By
Attorney

Jan. 29, 1935.　　　H. LEDEEN　　　1,989,619
BEARING
Filed June 22, 1931　　2 Sheets-Sheet 2

Inventor
Hyman Ledeen

By

Attorney

Patented Jan. 29, 1935

1,989,619

UNITED STATES PATENT OFFICE 1,989,619

BEARING

Hyman Ledeen, Los Angeles, Calif., assignor to The Falk Corporation, Milwaukee, Wis., a corporation of Wisconsin.

Application June 22, 1931, Serial No. 545,919

1 Claim. (Cl. 308—127)

This invention relates to bearings for line shafts and the like.

One object of the present invention is the provision of a bearing structure which will provide flooded lubrication for the shafting without danger of leakage.

Other more specific objects and advantages will appear from the following description of an illustrative embodiment of the present invention.

In the accompanying drawings:—

Figure 1:
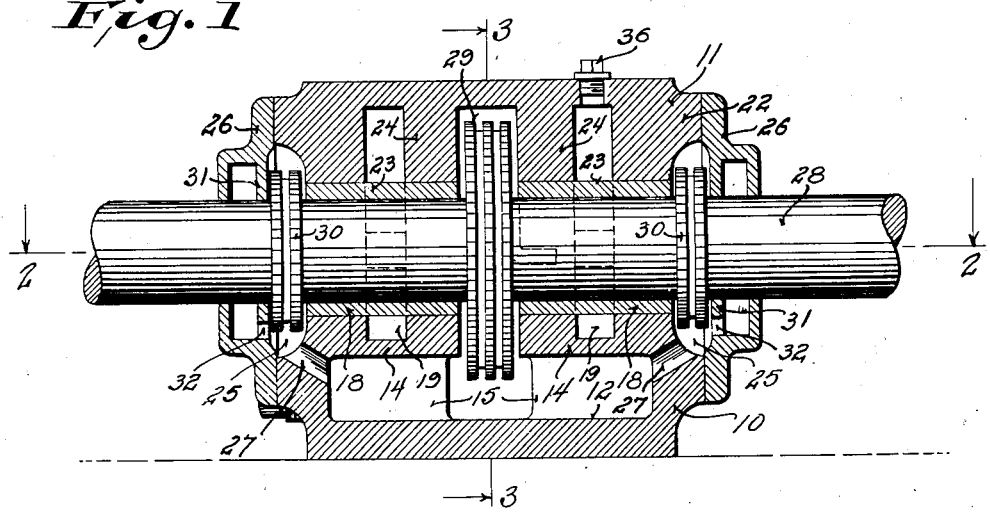
Figure 1 is a vertical longitudinal sectional view of a bearing structure constructed in accordance with the present invention.
Figure 2:
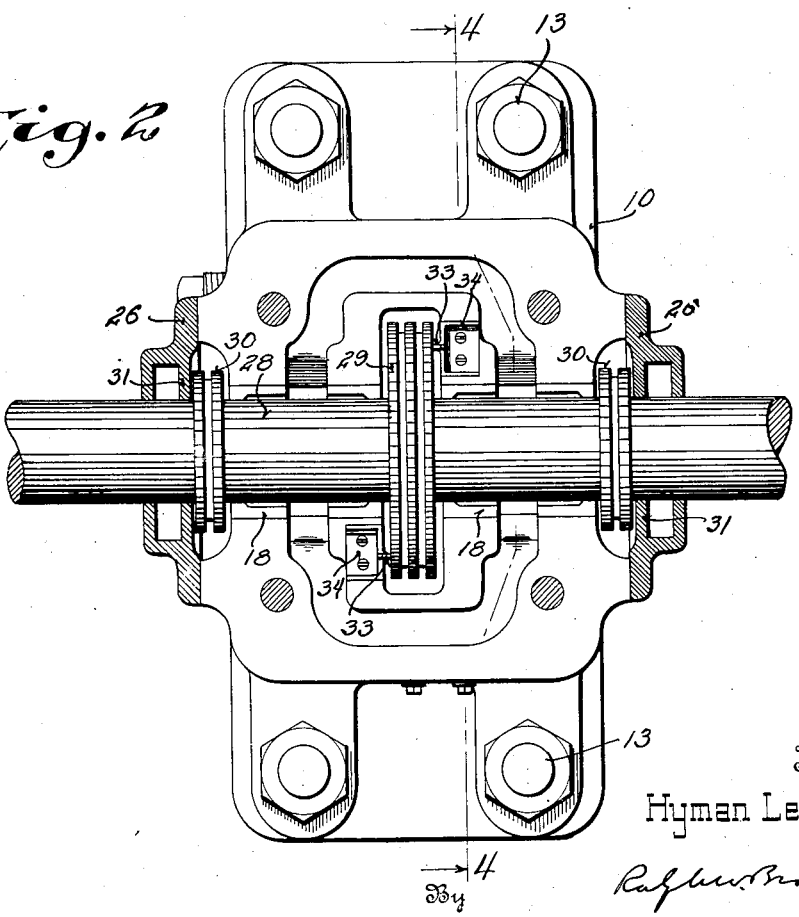
Fig. 2 is a horizontal sectional view on the line 2—2 of Fig. 1.
Figure 3:
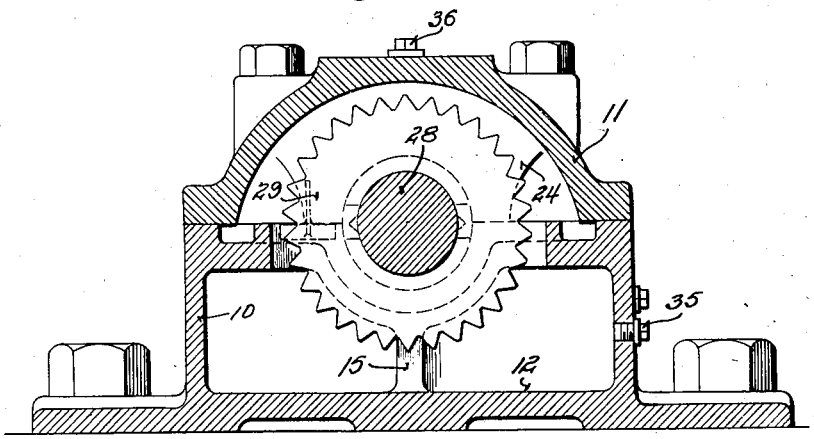
Fig. 3 is a transverse sectional view on the line 3—3 of Fig. 1.
Figure 4:
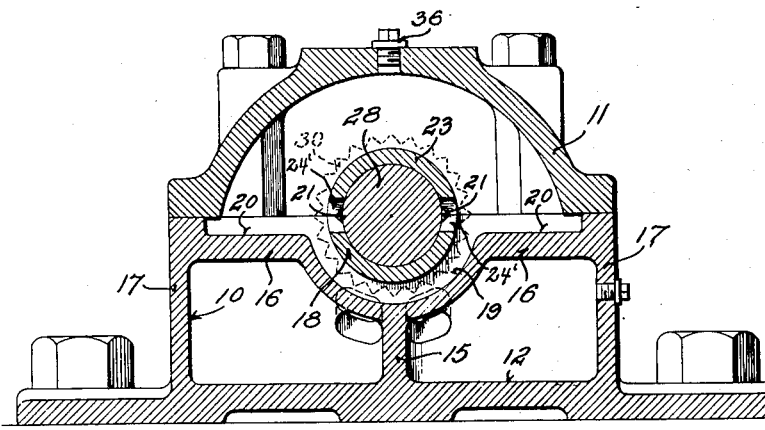
Fig. 4 is a transverse sectional view on the line 4—4 of Fig. 2.

The bearing shown comprises a housing which is longitudinally split into a bottom portion 10 and an arched cover portion 11. The bottom portion provides an ample reservoir for lubricating oil and the base 12 thereof is suitably fashioned for application to an appropriate foundation or other support by bolts 13. Two aligned semi-cylindrical bearing supports 14 formed integral with and within the bottom portion 10 of the housing extend inwardly from the opposite ends thereof. The supports are rigidly sustained by upright integral webs 15 and horizontal integral webs 16. The webs 16 extend inwardly from the side walls 17 of the bottom portion 10 of the housing and separate the interior of the bottom portion from the interior of the cover portion 11. Each bearing support 14 is hollowed out to form a semi-cylindrical seat for the lower half 18 of a cylindrical bearing sleeve, each seat being interrupted by a transverse channel 19 formed therein intermediate the ends thereof. A channel 20 formed in the top face of each horizontal web 16 communicates with both channels 19 and with notches 21 formed in the edges of the half bearing sleeves 18.

The cover portion 11 seats upon the marginal portions of the horizontal webs 16 and is provided with relative thick end portions 22 which are hollowed out to form semi-cylindrical seats for the outer ends of the upper halves 23 of the cylindrical bearing sleeves. Bearing supports 24 depending from the cover portion are similarly fashioned to receive the inner ends of the upper half bearing sleeves 23. The edges of the half bearing sleeves 23 also contain notches 24' which register with the notches 21 to form ports through which lubricating oil is admitted to the interior of the sleeves. The ends of both the bottom and cover portions of the housing are preferably recessed to form circular chambers 25 which are closed by appropriate end covers 26. Drain passages 27 in the bottoms of the chambers 25 discharge into the interior of the bottom of the housing.

The half-sleeves 18 and 23 together form bearings for a shaft 28 journaled therein. An oil thrower ring 29 fixed to the shaft between the bearing supports 14, dips into the body of oil contained in the bottom 10 of the housing, so that during rotation of the shaft oil is picked up by the ring and thrown onto the horizontal webs 16 and onto the cover 11 from whence it drains into the channels 20 to keep the channels 20 and 19 flooded. Since the interior of the bearing sleeves are always open to the channels 20 through the notches 21 and 24' these bearings are maintained flooded at all times. Additional oil thrower rings 30 on the shaft 28 beyond the bearing supports 14 intercepts leakage from the bearings and throws it with the chambers 25 from which it returns to the reservoir through the drain passages 27. As a further assurance against the escape of oil from the housing each end cover 26 is preferably formed with internal baffle flanges 31 which wipe from the shaft all oil that may have escaped beyond the throwers 30 and return it to the reservoir through drain passages 32.

Provision is also made for insuring a constant supply of oil to the channels 20 in the event that the speed of the rotation of the shaft, and consequently the ring 29, is insufficient to throw oil from the ring 29. This is accomplished in this instance by the use of wiper elements 33 which bear against the ring 29 and remove the oil therefrom. These elements are in the form of fingers supported by bracket plates 34 countersunk in the horizontal webs 16 and leading to the grooves 20. The arrangement is such that oil removed from the ring 29 by the fingers 33 is directed by the fingers and plates 34 to the channels 20 to assist in maintaining these channels flooded.

The bottom 10 of the housing is preferably provided with a drain passage normally closed by a screw plug 35, and oil is supplied to the housing preferably through filler opening in the cover portion thereof which is normally closed by a plug 36. This filler plug and opening is preferably disposed immediately above one of the channels 20 to insure flooding thereof during the filling process. The bottom of the housing is also provided with appropriate means such as a pair of plug controlled test openings for inspecting the oil level therein.

Various changes may be made in the embodiment of the invention hereinabove specifically described without departing from or sacrificing the advantages of the invention as defined in the appended claim.

I claim:—

In a bearing structure the combination of a housing having separable base and cover portions and an oil reservoir in said base portion, aligned bearing supports in said housing between said base and cover portions, horizontal webs extending from the sides of said base portion to said supports and separating said reservoir from the top of said housing, bearing sleeves seated in said supports, a channel in each support beneath the sleeve therein, a shaft journaled in said sleeves, an oil thrower on said shaft between said supports for transferring oil from said reservoir into the top of said housing, a horizontal channel in each web communicating with both of said first named channels for intercepting oil delivered from said thrower, and ports in said sleeves communicating with said channels through which said sleeves are maintained flooded with oil from said channels.

HYMAN LEDEEN.